(12) United States Patent
Ishikawa et al.

(10) Patent No.: US 7,141,206 B2
(45) Date of Patent: Nov. 28, 2006

(54) METHOD OF MANUFACTURING CLOSED SECTION STRUCTURE FILLED WITH FOAM AND CLOSED SECTION STRUCTURE MANUFACTURED BY THE SAME

(75) Inventors: Ryoichi Ishikawa, Saitama (JP);
Katsuhiro Shibata, Saitama (JP);
Kimihito Hayakawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 123 days.

(21) Appl. No.: 10/758,283

(22) Filed: Jan. 16, 2004

(65) Prior Publication Data

US 2004/0191107 A1 Sep. 30, 2004

(30) Foreign Application Priority Data

Jan. 17, 2003 (JP) .................... P2003-009242

(51) Int. Cl.
*B22F 3/00* (2006.01)
*B22F 7/14* (2006.01)
(52) U.S. Cl. .............................. 419/2; 419/8
(58) Field of Classification Search .............. 419/8, 419/2; 428/550, 553
See application file for complete search history.

(56) References Cited

U.S. PATENT DOCUMENTS

| 3,087,807 | A | * | 4/1963 | Allen et al. .................... 75/415 |
| 5,151,246 | A | * | 9/1992 | Baumeister et al. ........... 419/2 |
| 5,865,237 | A | * | 2/1999 | Schorghuber et al. ........ 164/79 |
| 5,930,580 | A | * | 7/1999 | Everett ........................... 419/2 |
| 6,168,072 | B1 | * | 1/2001 | Schwartz et al. ........ 228/235.1 |
| 6,391,250 | B1 | * | 5/2002 | Wolfsgruber et al. .......... 419/2 |
| 6,524,522 | B1 | * | 2/2003 | Vaidyanathan et al. ........ 419/2 |
| 6,698,331 | B1 | * | 3/2004 | Yu et al. ..................... 89/36.02 |
| 2004/0081571 | A1 | * | 4/2004 | Vatchiants ..................... 419/2 |

FOREIGN PATENT DOCUMENTS

JP 4-123781 11/1992

* cited by examiner

*Primary Examiner*—Ngoclan T. Mai
(74) *Attorney, Agent, or Firm*—Arent Fox PLLC

(57) ABSTRACT

An aluminum plate (13) is first plastic-deformed (FIG. 3D) in such a way as to envelop a foaming-agent compact (14), which is not foamed yet. Then, terminals of the aluminum plate (13) are integrally seam-welded (FIG. 3E) to thereby obtain a closed section structure (23). Subsequently, the foaming-agent compact (14) contained in the closed section structure (23) is foamed by being heated to foaming temperature thereof. Consequently, a pipe-like frame filled with a foam (27) is obtained.

8 Claims, 6 Drawing Sheets

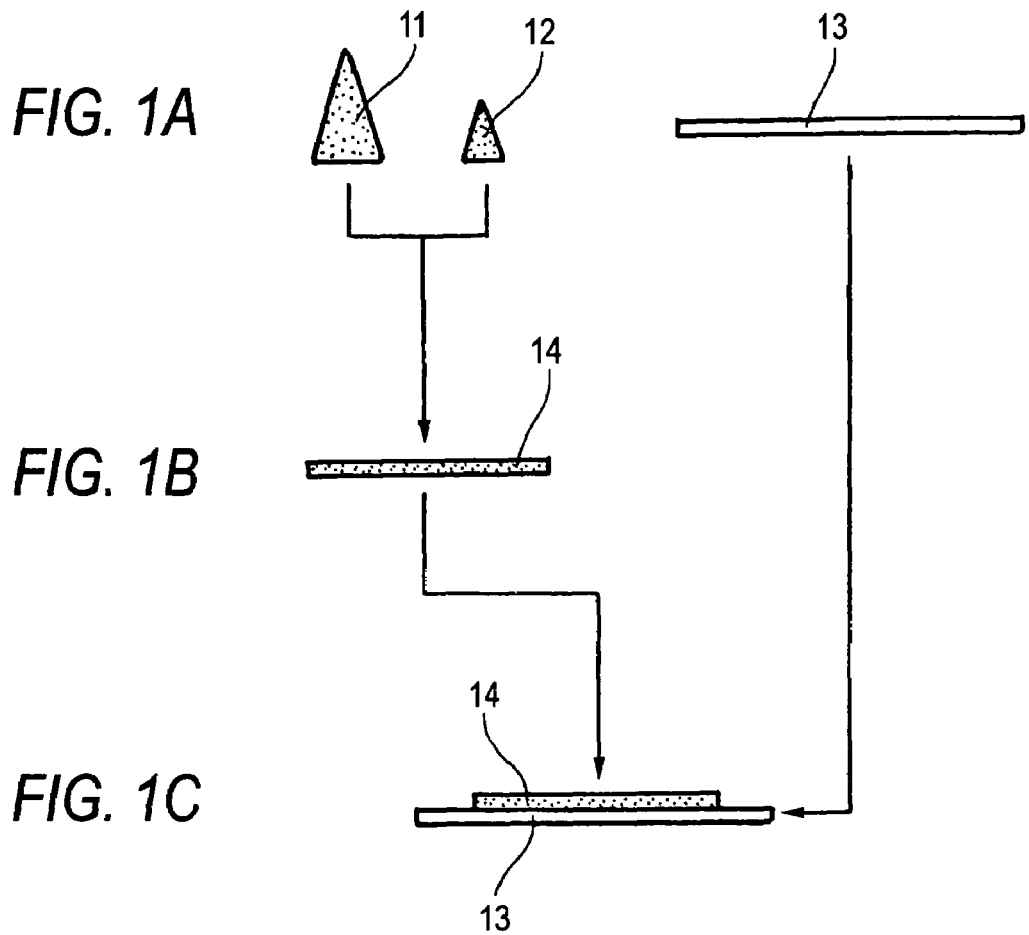
FIG. 1A
FIG. 1B
FIG. 1C
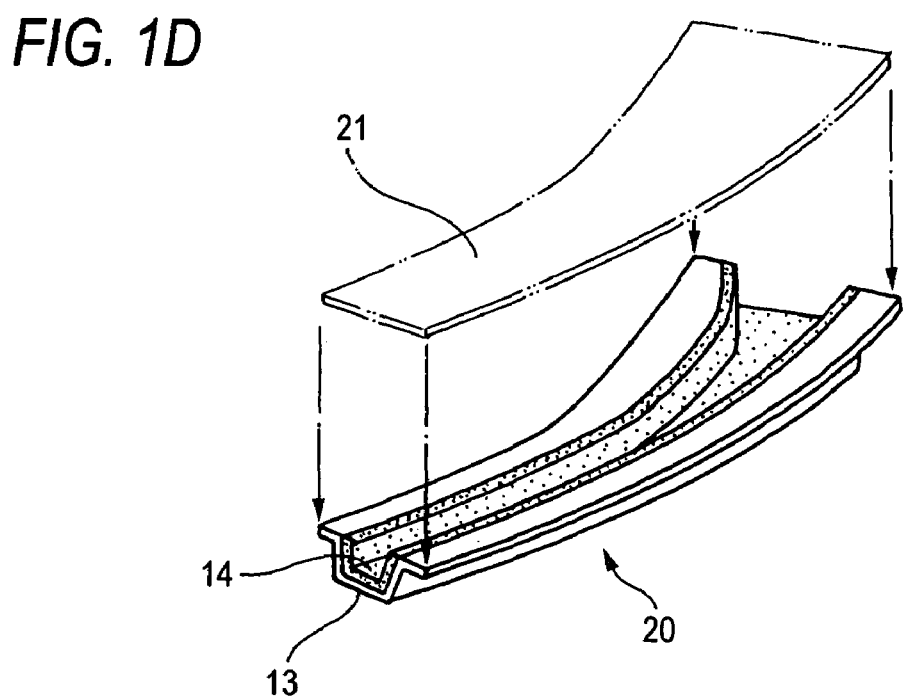
FIG. 1D

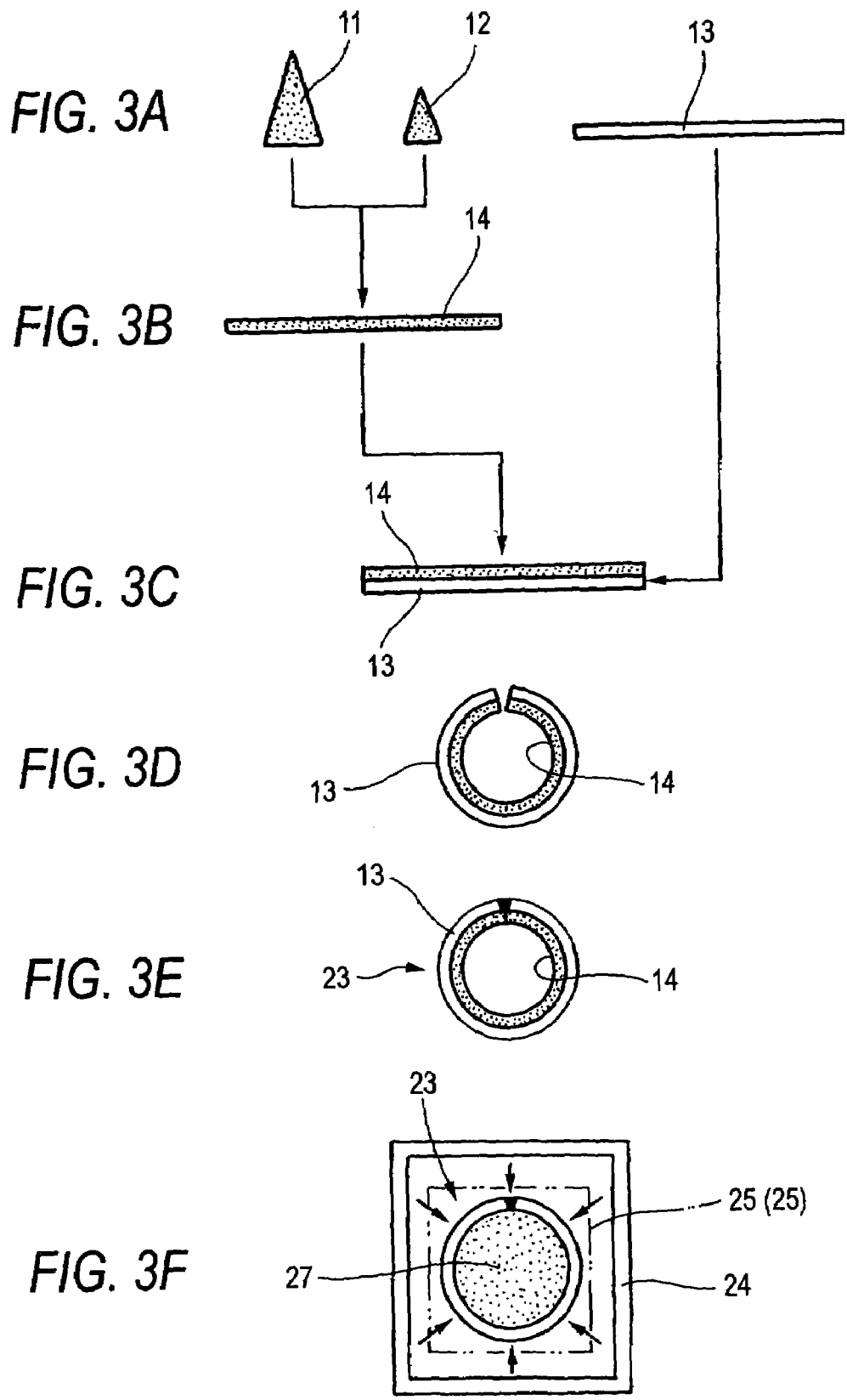

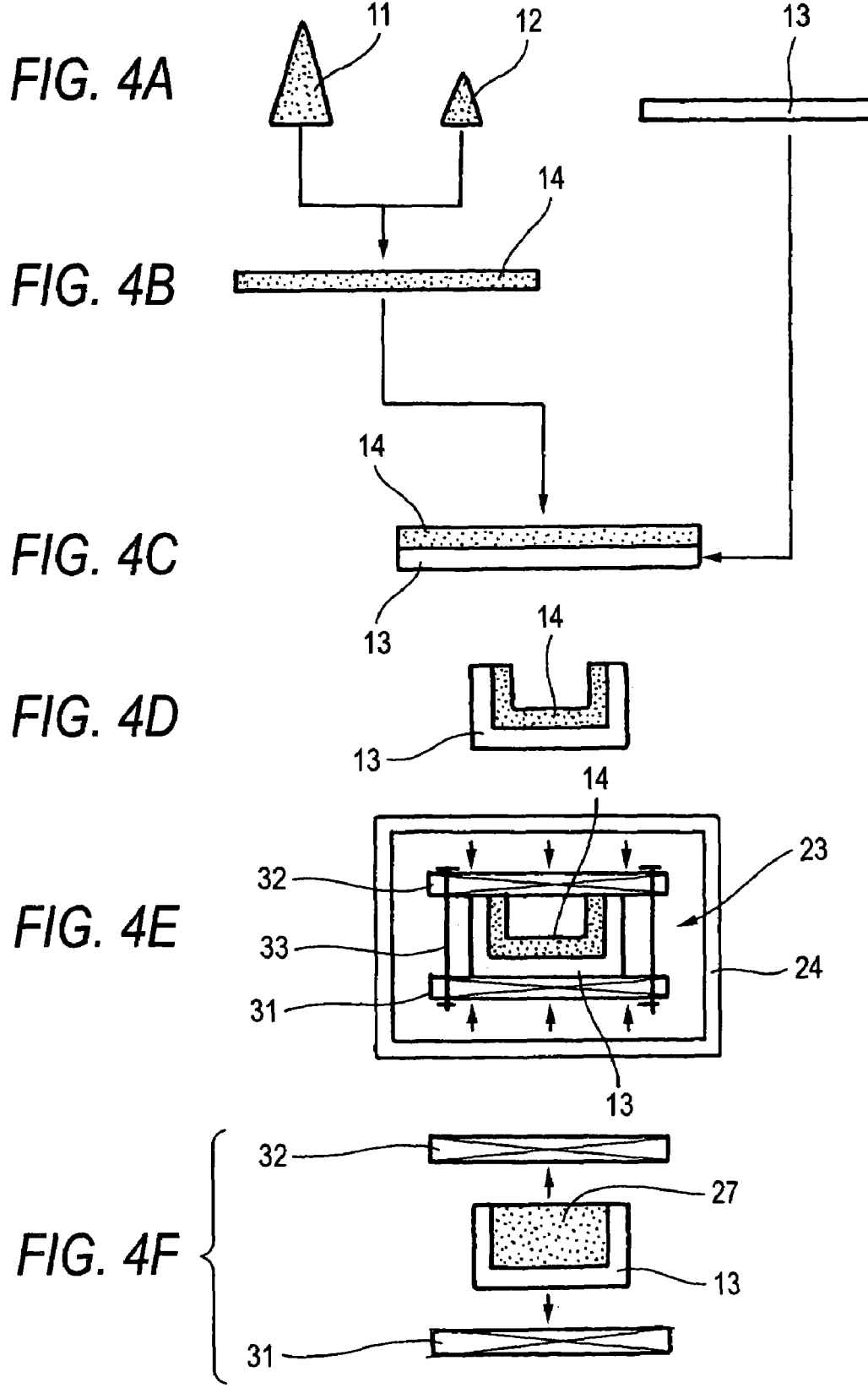

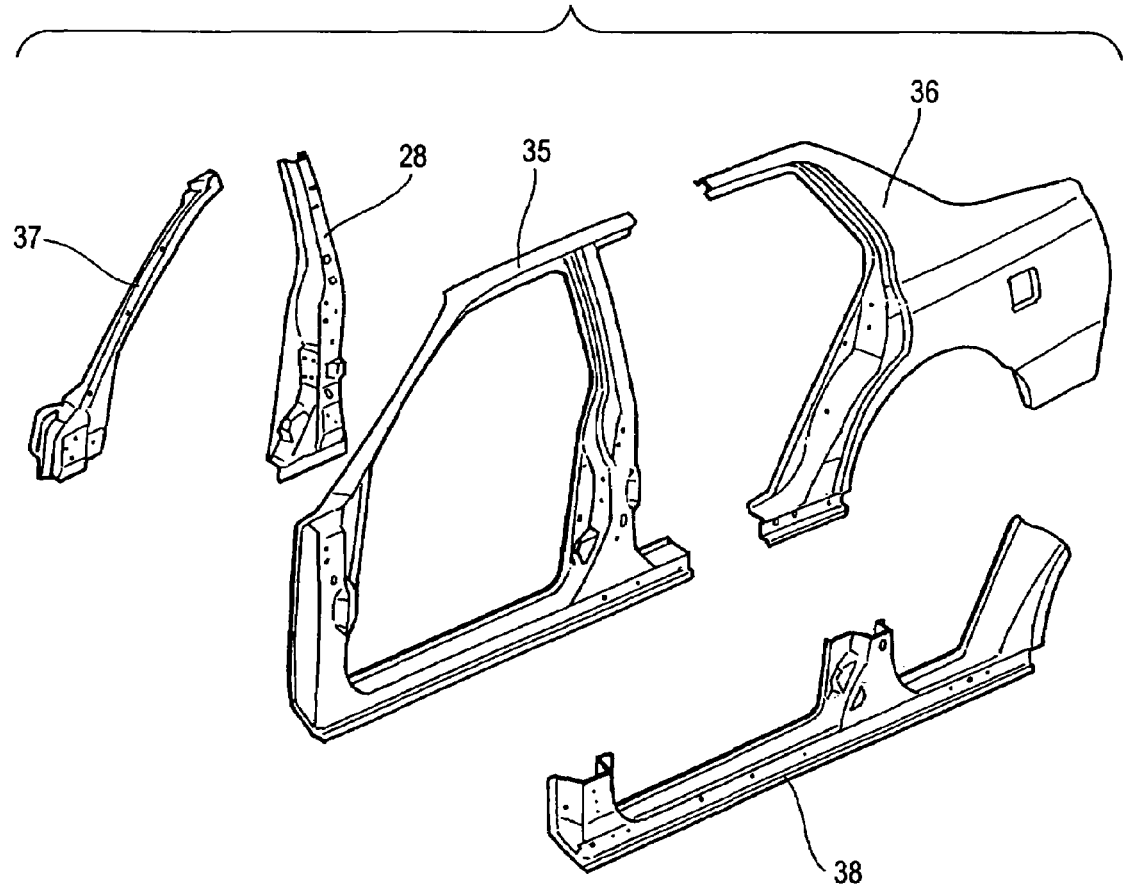

METHOD OF MANUFACTURING CLOSED SECTION STRUCTURE FILLED WITH FOAM AND CLOSED SECTION STRUCTURE MANUFACTURED BY THE SAME

BACKGROUND OF THE INVENTION

The present invention relates to a method of manufacturing a closed section structure, which is filled with a foam and serves as a carbody constituent used in, for example, a carbody pillar. Further, the present invention relates to a closed section manufactured by the method.

For example, a carbody center pillar adopts by preference a closed section structure obtained by overlaying a flat plate on a U-shaped cross-section material and by integrally welding both the flat plate and the U-shaped cross-section material. Filling a foam into a closed section space is known as a technique of enhancing rigidity thereof (see, for instance, Patent Document 1).

[Patent Document 1]
JP-UM-A-4-123781 (see page 5, and FIGS. 1 and 2)

FIGS. 6A to 6D are views reproduced from FIGS. 1 and 2 of JP-UM-A-4-123781. Incidentally, FIGS. 2 and 1 thereof are put together into a set of FIGS. 6A to 6D and arranged in this order. Additionally, reference characters are reassigned to constituent elements, respectively.

In a stage shown in FIG. 6A, an aluminum plate 102 indicated by an imaginary line is put on a lower die 101. Then, press molding is performed thereon by a punch 103. Thus, an outer panel 104 indicated by solid lines is obtained. This outer panel 104 is left attached to the lower die 101.

As shown in FIG. 6B, a foamed aluminum block 105 is put on the outer panel 104. The foamed aluminum block 105 is compressed by a punch 106.

Consequently, as shown in FIG. 6C, a compressed foam 107 can be filled into a concave portion of the outer panel 104.

Then, as shown in FIG. 6D, a flat-plate-like inner panel 108 is put thereon. Subsequently, flanges of the panels 104 and 108 are spot-welded to each other, so that these panels are integrated with each other. Consequently, a center pillar 109, whose closed section space is filled with the foam 107, can be obtained.

Although the inner section of the aforementioned center pillar 109 is a simple rectangular one, most of those of actual carbody constituents, such as a center pillar, are complicated closed sections, such as polygonal ones, due to necessity of design thereof or the like.

There are two possible methods of manufacturing carbody constituents respectively having complicated closed sections. One is a "postprocessing method" of additionally performing press working on the center pillar 109, which is rectangular cross sectionally shaped and obtained in the stage shown in FIG. 6D. The other is a "concurrent processing method" of shaping the outer panel 104 and the foamed aluminum block 105 in the stages illustrated in FIGS. 6A to 6C in such a way as to have complicated section shapes.

According to the postprocessing method, the filled foam 107 may come off the outer panel 104 to thereby generate a space therein. The generation of a space makes it impossible to desirably increase the rigidity of carbody constituents.

According to the concurrent processing method, there is no such fear. However, there is the necessity for preliminarily shaping the foamed aluminum block 105 in such a manner as to have a complicated section. Thus, the manufacturing cost thereof runs up.

SUMMARY OF THE INVENTION

Accordingly, an object of the invention is to provide a technique enabling low-cost manufacture of a closed section structure that is filled with a foam and has a complicated section.

To achieve the foregoing object, according to the invention, there is provided a method of manufacturing a closed section structure filled with a foam, which comprises a preparing step of preparing metallic powder, a foaming agent, and a metallic flat plate, a foaming-agent compacting step of mixing the foaming agent into the metallic powder and compacting a resultant mixture into a flat-plate-like compact, a step of attaching the obtained foaming-agent compact to one of side faces of the metallic flat plate, a plastic-forming step of obtaining a closed section structure by plastic-deforming the metallic flat plate in such a way as to envelop the compact, and a foaming step of foaming the foaming-agent compact, which is contained in a closed section structure, by heating the compact to a foaming temperature.

The term "foaming agent" designates chemicals, such as a powdered agent.

The term "foaming-agent compact" designates a substance made by compacting a mixture of a foaming agent and another material.

The term "foam" designates a foamed porous substance.

In the plastic-forming step, the metallic flat plate can be deformation-processed into a closed section structure of a desired shape. Thus, according to the invention, a closed section structure of a desired shape can be obtained.

Further, after the shape of the closed section structure is determined, the foaming agent is foamed in the foaming step. Subsequently, the foam is filled in the closed section structure. Consequently, according to the invention, the closed section structure can be sufficiently densely filled with the foam, so that the rigidity of the foam can be brought out.

Additionally, it is sufficient to compact the foaming agent into a flat-plate-like compact. There is no necessity for compacting the foaming agent into compacts of various shapes. Consequently, the compacting cost of the foaming agent does not mount up.

Thus, according to the invention, closed section structures, which are densely filled with foams and have various shapes, can easily be manufactured at low cost.

BRIEF DESCRIPTION OF THE DRAWINGS

FIGS. 1A to 1D are views illustrating a first-half of a process of manufacturing a center pillar according to the invention.

FIGS. 3A to 3F are views illustrating a process of manufacturing a pipe-like frame according to the invention.

FIGS. 4A to 4F are views illustrating a process of manufacturing a channel frame according to the invention.

FIG. 5 is an exploded perspective view illustrating a carbody frame.

DETAILED DESCRIPTION OF THE PREFERERRED EMBODIMENTS

Figure 2A:
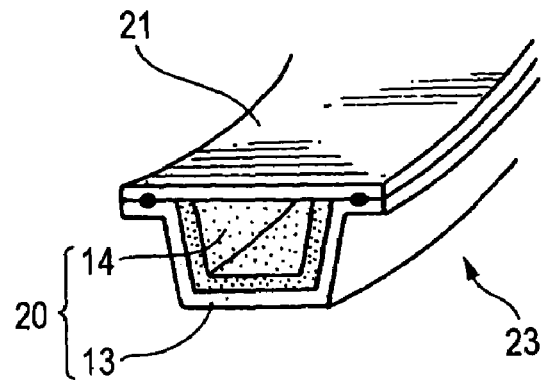
FIGS. 2A to 2C are views illustrating a second half of the process of manufacturing a center pillar according to the invention.

Hereinafter, an embodiment of the invention is described with reference to the accompanying drawings. Incidentally, in the following description, aluminum powder is used as an example of the metallic powder. An aluminum flat plate or an aluminum plate is used as an example of the metallic flat plate or the metallic plate.

FIGS. 1A to 1D are views illustrating a first half of a process of manufacturing a center pillar according to the invention.

FIG. 1A illustrates a preparing step in which aluminum powder 11, a foaming agent 12, and a flat-plate-like aluminum plate 13 are prepared. The aluminum powder 11 is, for example, Al—Si alloy powder. The foaming agent 12 is TiH (Titanium Hydride) powder.

FIG. 1B illustrates a foaming-agent compacting step in which the foaming agent is mixed into the aluminum-powder, and in which this mixture is then compacted into a flat-plate-like compact by a compacting method, so that a foaming-agent compact is obtained. A mixing ratio between the aluminum powder and the foaming-agent powder is determined so that this mixture contains the aluminum powder of 99 wt % and the foaming-agent powder 1 wt %. It is sufficient to empirically determine the size, such as the thickness, of the foaming-agent compact 14 so that the density of the foam, which is measured after foamed in a post-process, is within a desired range.

FIG. 1C illustrates an attaching step in which the foaming-agent compact 14 is attached to one of the side faces of the aluminum plate 13. For instance, the foaming-agent compact 14 extruded at 300° C. upon completion of the powder mixing and the compacting is put on the aluminum plate 13. Then, the foaming-agent compact 14 is pressed by a roller or a punch. Thus, the foaming-agent compact 14 is attached to one of top and bottom surfaces of the aluminum plate 13.

FIG. 1D illustrates a first half of a plastic-forming step, in which the aluminum plate 13 is plastic-deformed in such a way as to envelop the foaming-agent compact 14. Concretely, the aluminum plate 13 is put on a die (not shown) such that the foaming-agent compact 14 is superposed on the aluminum plate 13. Then, the aluminum plate 13 is plastic-deformed together with the foaming-agent compact 14 by a punch (not shown) in such a way as to have a groove cross-section. Thus, an outer panel 20 of the center pillar is obtained. Then, an inner panel 21 indicated by imaginary lines is put thereon. Incidentally, the foaming-agent compact may be provided at the side of the inner panel in addition to the compact provided at the side of the outer panel. Alternatively, the foaming-agent compact may be provided only at the side of the inner panel.

Figure 2B:
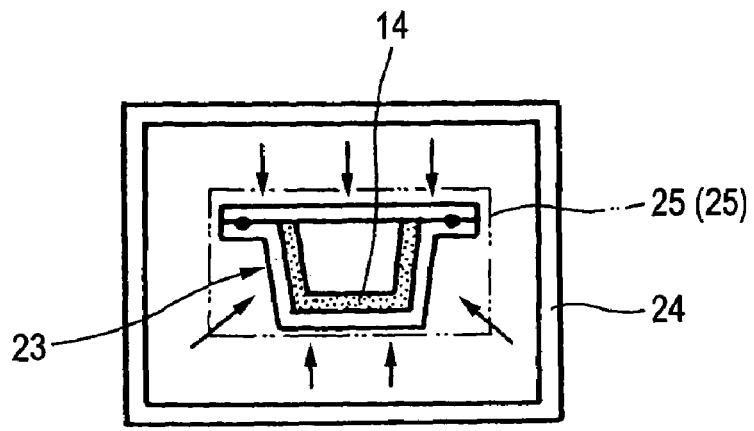
Figure 2C:
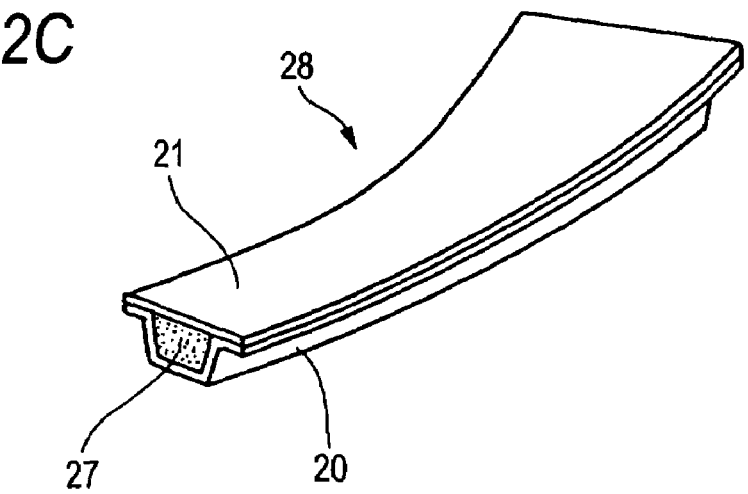
Figure 6A:
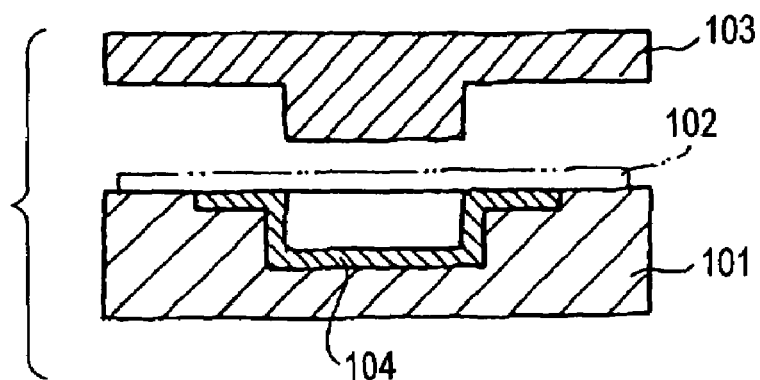
FIGS. 6A to 6D are views reproduced from FIGS. 1 and 2 of Patent Document 1 (JP-UM-A-4-123781).
Figure 6B:
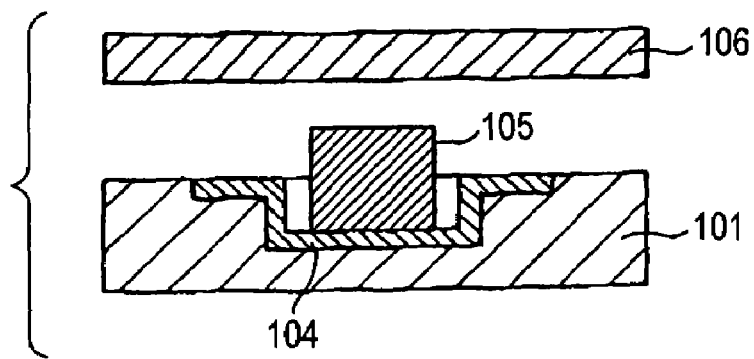
Figure 6C:
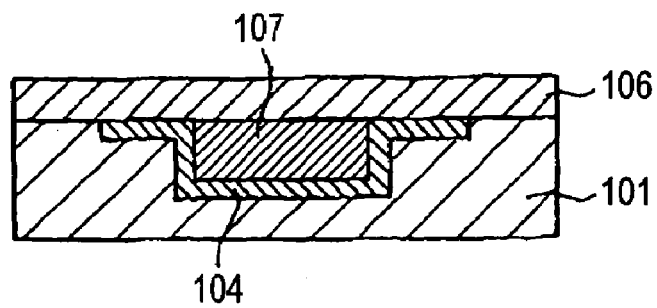
Figure 6D:
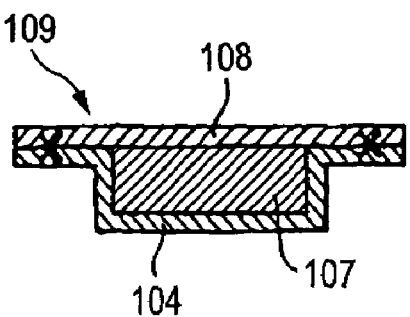

FIGS. 2A to 2C are views illustrating a second half of the process of manufacturing a center pillar according to the invention.

FIG. 2A illustrates a second half of the plastic-forming step. The inner panel 21 is spot-welded to the outer panel 20, so that these panels are integrated with each other. Thus, a closed section structure 23 is obtained. The term "closed section structure" designates a structure whose inside is cut off from the outside, similarly to a tube.

FIG. 2B illustrates a foaming step in which the foaming-agent compact 14 contained in the closed section structure 23 is foamed by being heated to a foaming temperature thereof. Concretely, the closed section structure 23 is put in a heating furnace 24. Subsequently, front and rear openings thereof are blocked up by blind plates 25, 25 indicated by imaginary lines. Then, the temperature of the foaming-agent compact 14 is raised to about 550° C. to 600° C. Consequently, the foaming-agent compact 14 is foamed and increases in amount. A closed section space, that is, the inside of the closed section structure 23 is filled with a foam. Incidentally, it is desirable that a small-diameter hole is preliminarily formed in the blind plate 25, and that gas generated by the foaming of the compact is released therethrough to the outside to thereby eliminate the influence of the generated gas.

FIG. 2C illustrates a center pillar 28 serving as an aluminum product filled with the foam 27. That is, the center pillar 28 is obtained in such a manner that the closed section space surrounded by the outer panel 20 and the inner panel 21 is filled with the foam 27 having a density of about 0.6 g/cm$^3$.

In the plastic-forming step, the aluminum flat plate can be deformation-processed into a closed section structure of a desired shape. Therefore, according to the invention, a structure of a desired shape can be obtained.

Further, after the shape of the closed section structure is determined, the foaming agent is foamed in the foaming step. Subsequently, the foam is filled in the closed section structure. Consequently, according to the invention, the closed section structure can be sufficiently densely filled with the foam, so that the rigidity of the foam can be brought out.

Additionally, it is sufficient to compact the foaming agent into a flat-plate-like compact. It is unnecessary to compact the foaming agent into compacts of various shapes. Consequently, the compacting cost of the foaming agent does not run up.

Accordingly, according to the invention, closed section structures, which are densely filled with a foam and have various shapes, can easily be manufactured at low cost.

FIGS. 3A to 3F are views illustrating a process of manufacturing a pipe-like frame according to the invention.

FIG. 3A illustrates a preparing step in which aluminum powder 11, a foaming agent 12, and a flat-plate-like aluminum plate 13 are prepared. The aluminum powder 11 is, for example, Al—Si alloy powder. The foaming agent 12 is TiH (Titanium Hydride) powder.

FIG. 3B illustrates a foaming-agent compacting step in which the foaming agent is mixed into the aluminum powder, and in which this mixture is then compacted into a flat-plate-like compact by the compacting method, so that a foaming-agent compact is obtained. A mixing ratio between the aluminum powder and the foaming-agent powder is set so that this mixture contains the aluminum powder of 99 wt % and the foaming-agent powder 1 wt %.

FIG. 3C illustrates an attaching step in which the foaming-agent compact 14 is attached to one of the side faces of the aluminum plate 13. For example, the foaming-agent compact 14 extruded at 300° C. after the powder mixing and the compacting is put on the aluminum plate 13. Subsequently, the foaming-agent compact 14 is pressed by a roller or a punch. Thus, the foaming-agent compact 14 is attached to one of top and bottom surfaces of the aluminum plate 13.

FIG. 3D illustrates a first half of a plastic-forming step, in which the aluminum plate 13 is plastic-deformed in such a way as to envelop the foaming-agent compact 14. Concretely, the aluminum plate 13 is put on a die (not shown) such that the foaming-agent compact 14 is superposed on the aluminum plate 13. Then, the aluminum plate 13 is plastic-deformed by a pipe forming roll (not shown) in a cylindrical shape with the foaming-agent compact 14 inside.

FIG. 3E illustrates a second half of the plastic-forming step. Both terminal portions of the aluminum plate 13 are integrated by being spot-welded to each other. Consequently, a closed section structure 23 is obtained.

FIG. 3F illustrates a foaming step in which the foaming-agent compact 14 contained in the closed section structure 23 is foamed by being heated to a foaming temperature thereof. Concretely, the closed section structure 23 is put in a heating furnace 24. Subsequently, front and rear openings thereof are blocked up by blind plates 25, 25 indicated by imaginary lines. Then, the temperature of the foaming-agent compact 14 is raised to about 550° C. to 600° C. Consequently, the foaming-agent compact 14 is foamed and increases in amount. A closed section space, that is, the inside of the closed section structure 23 is filled with a foam.

Resultantly, a pipe-like frame (a kind of the closed section structure) filled with the foam 27 can be obtained.

FIGS. 4A to 4F are views illustrating a process of manufacturing a channel frame according to the invention.

FIG. 4A illustrates a preparing step in which aluminum powder 11, a foaming agent 12, and a flat-plate-like aluminum plate 13 are prepared. The aluminum powder 11 is, for example, Al—Si alloy powder. The foaming agent 12 is TiH (Titanium Hydride) powder.

FIG. 4B illustrates a foaming-agent compacting step in which the foaming agent is mixed into the aluminum powder, and in which this mixture is then compacted into a flat-plate-like compact by the compacting method, so that a foaming-agent compact is obtained. A mixing ratio between the aluminum powder and the foaming-agent powder is set so that this mixture contains the aluminum powder of 99 wt % and the foaming-agent powder 1 wt %.

FIG. 4C illustrates an attaching step in which the foaming-agent compact 14 is attached to one of the side faces of the aluminum plate 13. For example, the foaming-agent compact 14 extruded at 300° C. after the powder mixing and the compacting is put on the aluminum plate 13. Subsequently, the foaming-agent compact 14 is pressed by a roller or a punch. Thus, the foaming-agent compact 14 is attached to one of sides of the aluminum plate 13.

FIG. 4D illustrates a first half of a plastic-forming step, in which the aluminum plate 13 is plastic-deformed in such a way as to envelop the foaming-agent compact 14. Concretely, the aluminum plate 13 is put on a die (not shown) such that the foaming-agent compact 14 is superposed on the aluminum plate 13. Subsequently, the aluminum plate 13 is plastic-deformed by a forming press (not shown) into a channel-like shape with the foaming-agent compact 14 inside.

FIG. 4E illustrates a second half of the plastic-forming step and also illustrates a foaming step. The aluminum plate 13 is put on a base 31. To sandwich this aluminum plate 13 and the foaming-agent compact 14, a pressing lid 32 is put thereon and pushed by a tie-rod 33 against the base 31. Consequently, a closed section structure 23 can be obtained by using the pressing lid 32 and the channel aluminum plate 13.

Then, the foaming-agent compact 14 contained in the closed section structure 23 is foamed by being heated to a foaming temperature thereof. Concretely, the closed section structure 23 is put in a heating furnace 24. Subsequently, front and rear openings thereof are blocked up by blind plates (not shown). Subsequently, the temperature of the foaming-agent compact 14 is raised.to about 550° C. to 600° C. Consequently, the foaming-agent compact 14 is foamed and increases in amount. A closed section space, that is, the inside of the closed section structure 23 is filled with a foam.

In a step illustrated in FIG. 4F, a channel frame (a kind of the closed section structure) filled with the foam 27 can be obtained by removing the pressing lid 32.

FIG. 5 is an exploded perspective view illustrating a carbody frame. The method according to the invention is suitable for manufacturing a center pillar 28 interposed between a front side panel 35 and a rear side panel 36, a front pillar disposed in front of the front side panel 35, and a side sill 38 disposed under the rear side panel 36 and the front side panel 35. Additionally, the invention can be applied to the manufacture of vehicle constituent members, such as a suspension arm.

The invention can be applied to building structures, general machineries, and industrial machines, in addition to carbody frames. That is, the kind of a closed section structure, to which the invention is applied, is not limited to a specific one. As long as the closed section structure is filled with a foam, the manufacturing method according to the invention can be applied thereto.

Incidentally, the kind of the foaming agent is not limited to a specific one. A foaming agent foamed by a carbonic acid gas may be used instead of titanium hydride.

The metallic powder may be magnesium alloy powder, zinc alloy powder, or copper alloy powder, instead of aluminum powder. The kind of the metallic powder is not limited to a specific one. This is the same with the metallic flat plate. However, because both the enhancement of strength of the structure and the reduction in weight thereof can easily be achieved in the case of using aluminum powder and an aluminum flat plate, it is preferable that the invention is applied to the structure using aluminum powder and an aluminum flat plate.

With the aforementioned configuration, the invention has the following advantages.

According to the invention, in the plastic-forming step, the aluminum flat plate can be deformation-processed into a closed section structure of a desired shape. Thus, according to the invention, a closed section structure of a desired shape can be obtained.

Further, after the shape of the closed section structure is determined, the foaming agent is foamed in the foaming step. Then, the foam is filled in the closed section structure. Consequently, according to the invention, the closed section structure can be sufficiently densely filled with the foam, so that the rigidity of the foam can be brought out.

Additionally, it is sufficient to compact the foaming agent into a flat-plate-like compact. There is no need for compacting the foaming agent into compacts of various shapes. Thus, the compacting cost of the foaming agent does not run up.

Therefore, according to the invention, closed section structures, which are densely filled with a foam and have various shapes, can easily be manufactured at low cost.

What is claimed is:

1. A method of manufacturing a closed section structure filled with a foam, comprising:
    mixing a foaming agent into a metallic powder and compacting a resultant mixture into a flat-plate-like foaming agent compact;
    attaching the obtained foaming-agent compact to one of side faces of a metallic flat plate;
    plastic-deforming the metallic flat plate in such a way as to envelop the compact and obtaining a closed section structure; and
    heating the compact to a foaming temperature to activate the foaming-agent compact within the closed section structure.

2. The method of manufacturing a closed section structure as set forth in the claim 1, wherein
the foaming agent is Titanium Hydride powder.

3. The method of manufacturing a closed section structure as set forth in the claim 1, wherein
the metallic powder is aluminum powder.

4. The method of manufacturing a closed section structure as set forth in the claim 1, wherein
the metallic plate is an aluminum plate.

5. The method of manufacturing a closed section structure as set forth in claim 1, wherein the foaming agent comprises carbonic acid.

6. The method of manufacturing a closed section structure as set forth in claim 1, wherein the metallic powder is selected from the group consisting of magnesium alloy powder, zinc alloy powder, and copper alloy powder.

7. The method of manufacturing a closed section structure as set forth in claim 1, wherein the step of mixing comprises mixing the foaming agent and metallic powder in a ratio of 1% wt/199% wt.

8. The method of manufacturing a closed section structure as set forth in claim 1, wherein the step of attaching comprises pressing the foaming agent composite with a roller or a punch to the metallic flat plate.

* * * * *